No. 832,524. PATENTED OCT. 2, 1906.
E. E. ANDREWS.
FRICTION CLUTCH.
APPLICATION FILED FEB. 5, 1906.
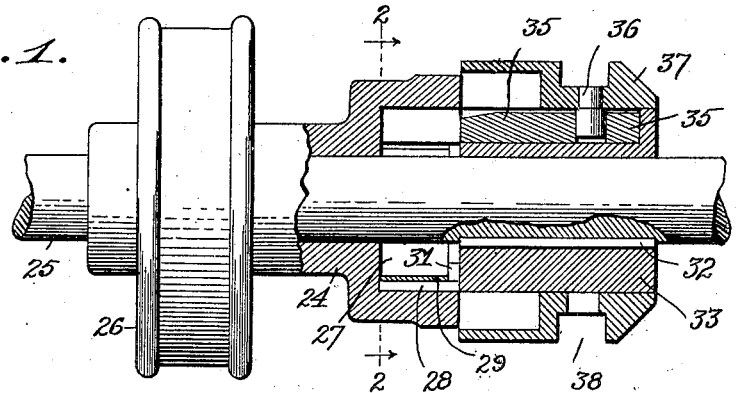
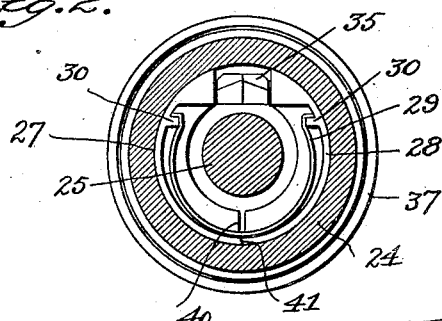
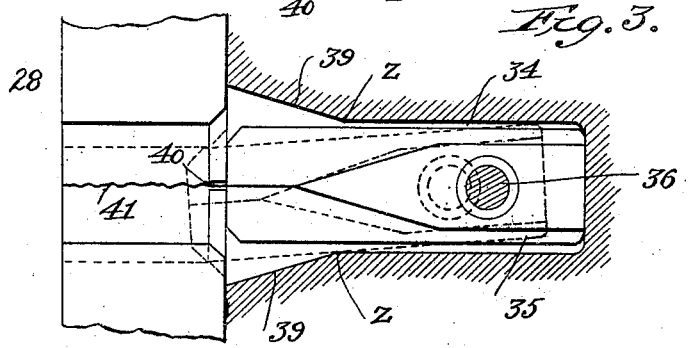
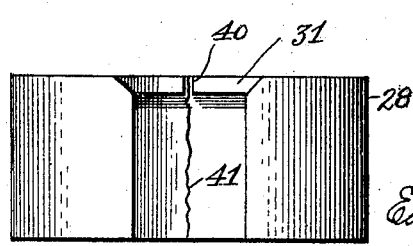
Witnesses
Edwin L. Yewell
Edwin F. Frey
Inventor
Edwin E. Andrews
by Percy B. Hills
Attorney
THE NORRIS PETERS CO., WASHINGTON, D. C.

UNITED STATES PATENT OFFICE.

EDWIN EADS ANDREWS, OF AKRON, OHIO.

FRICTION-CLUTCH.

No. 832,524. Specification of Letters Patent. Patented Oct. 2, 1906.

Application filed February 5, 1906. Serial No. 299,550.

*To all whom it may concern:*

Be it known that I, EDWIN EADS ANDREWS, a citizen of the United States, residing at Akron, in the county of Summit, State of Ohio, have invented new and useful Improvements in Friction-Clutches, of which the following is a specification.

My invention relates to friction-clutches of that type in which an expansible member, such as a split ring, is employed as the means of connection between the two members of the clutch, and has for its main object to provide certain improvements in that form of clutch disclosed in Letters Patent No. 818,331, granted to me April 17, 1906, wherein the gripping member is forced into gripping action by means independent of the clutch members and caused to automatically increase the gripping action in proportion to any increase in the load, said improvements consisting, first, in operating the gripping member by means of a lever movable toward and from said gripping member, and, secondly, in providing for the complete disengagement of said lever from said gripping member when the latter is out of gripping action, whereby said gripping member will be permitted to move or remain at rest in unison with its carrying clutch member, thereby eliminating the wear between the two.

Certain other novel embodiments are found in my improved construction, as will be hereinafter more definitely pointed out and claimed, reference being had to the accompanying drawings, in which—

Figure 1 is a vertical longitudinal sectional view of my improved clutch. Fig. 2 is a transverse sectional view taken on the line 2 2, Fig. 1. Fig. 3 is an enlarged detail longitudinal sectional view taken at a right angle to Fig. 1, the lever and split ring being shown in full lines. Fig. 4 is an enlarged detail top plan view of the split ring when considered in the position shown in Figs. 1 and 2.

Similar characters of reference denote corresponding parts in the several views.

In the said drawings the reference-numeral 24 denotes the driving member of the clutch, the same being mounted to freely rotate on shaft 25 and being provided with the usual driving-pulley 26 for receiving the driving-belt. (Not shown.) At one end the clutch member 24 is enlarged and internally recessed at 27 to receive loosely therein the split ring 28. Said split ring is preferably formed in two parts in a manner hereinafter described, and located within the same is a spring 29, having its ends bent and engaging projections 30, formed on the inner surfaces of the sections of the split ring, a flange or collar 31, formed on one inner side of said split ring, serving, with the vertical wall of the recess 27, to prevent lateral displacement of the spring 29. Keyed to the shaft 25 at 32 is the driven member 33 of the clutch, the same being recessed at 34 to receive therein a wedge or lever 35, said recess being somewhat wider than the width of said wedge or lever to permit independent lateral movement to the latter therein, as shown in Fig. 3, and said wedge or lever being movable longitudinally in said recess. A pin 36 pivotally connects said wedge or lever with an exterior sleeve 37, grooved annularly at 38 to receive the shifting-lever (not shown) of any well-known construction. The ends of the walls of the recess 34 nearest the split ring 28 are flared at 39, while the adjacent end of the wedge or lever 35 has its corners beveled, as are the adjacent corners of the ends of the split ring 28 where it receives the said wedge or lever 35, all as shown in Fig. 3.

From the above description the operation of my improved construction will be understood to be as follows: Power being applied to the driving member 24 of the clutch the same will be rotated thereby, and while the wedge or lever 35 lies in the position shown in Figs. 1 and 3—that is to say, moved longitudinally to the right—so as to be out of engagement with the ends of the split ring 28, the latter will rotate with said clutch, member 24, being held in frictional contact therewith by outward pressure of the spring 29, said spring by reason of its engagement with the projections 30 in the split ring maintaining the two sections thereof in the illustrated position, the working ends thereof being at all times spaced apart to receive the end of the wedge or lever 35 therebetween. The two members of the clutch are thus disconnected and the member 33 permitted to remain at rest, the split ring 28 rotating in unison with the member 24, thus effectually preventing the constant wear on the inner surface of the recess 27 and on the split ring, which necessarily takes place when the split ring is held against movement with its clutch member. Now when it is desired to connect the two members of the clutch the collar 37 is forced to the left, thus forcing the wedge or lever 35 in the same direction and against the side of the split ring 28, so that when the working opening in the latter registers with said wedge or lever the latter will be forced into the same, and thus check the rotation of said split ring, this entrance of the wedge or lever between the ends of the split ring being facilitated by the beveling of the meeting faces of the two, as shown. A further movement of the collar 37 and wedge or lever 35 to the left will by reason of the drag on the split ring tilt said wedge or lever in the direction of travel of the member 24, room for this tilting being afforded by the larger cross-area of the recess 34 as compared with the width of the wedge or lever, as well as by the flaring portion 39. This tilting of the wedge or lever 35 will necessarily increase the distance between the ends of the split ring 28, thus causing said split ring to expand and tend to grip its member 24, so that a point will finally be reached by the movement of said wedge or lever to the left between the ends of the split ring that will expand said split ring sufficiently to cause it to firmly grip its member 24 and carry with it the wedge or lever and the load imposed on the member 33 of the clutch. As in my application hereinbefore referred to the parts will be so proportioned that this complete gripping action will take place before the wedge or lever 35 reaches its limit of movement to the left and between the ends of the split ring, the result being also, as in said former application, that when said wedge or lever is moved to its limit of movement to the left any subsequent increase in the load imposed on the driven member 33 will, through the frictional drag on the split ring 28, automatically cause a further tilting of the wedge or lever 35 on one of the points z as a fulcrum, whereby the greater the load imposed on member 33 the harder the gripping action of the split ring 28.

My preferred manner of forming the split ring 28 in two parts is to first cast or otherwise form said split ring in a single piece and to then divide it into halves, preferably by first sawing the flange or collar 31 thereon at 40 and then fracturing the body portion of the split ring, as indicated at 41. The advantage of this construction is that the split ring can be readily formed initially of the exact diameter for use and will retain that diameter when fractured, whereas with split rings initially formed in two or more sections it is more difficult to obtain the accurate diameter, and when initially formed in a single section and then completely divided by cutting it is even more difficult to obtain an accurate diameter, owing to the removal of a portion of the ring by the cutting and a consequent reduction in diameter to that extent.

It will be observed that while the wedge or lever 35 is pivoted to the collar 37 for the sole purpose of longitudinally moving the two in unison there is no fixed pivotal connection between said wedge or lever and its member 33, and as the collar 37 is free to rotate on said member 33 full lateral movement is permitted to wedge or lever 35 in recess 34, the point of pivotal action between said wedge or lever and its member being at one of the points z in respect to said member (dependent on the direction of rotation of the member 24,) and at a shiftable longitudinal point on said wedge or lever, dependent on its position longitudinally with respect to the member 33.

I have found in practice that when the wedge or lever 35 is shifted just sufficiently to engage and check the rotation of the split ring 28—say to the position shown in dotted lines in Fig. 3—there will be practically no expansion of the split ring, and therefore no gripping action, so that if it is not desired to completely disengage the wedge or lever and the split ring a stop may be located on the member 33 to check the movement of the collar 37 and the wedge or lever 35 to the right at this point, whereby the said wedge or lever and split ring will be at all times in operative connection.

It will of course be understood that the operation of the clutch may be reversed and the power applied to the member 33, which may be in turn imparted to the member 24 through the wedge or lever 35 and the split ring 28, the operation of the clutch being the same no matter which may be the driving and driven members.

Having thus described my invention, what I claim as new, and desire to secure by Letters Patent, is—

1. In a friction-clutch, the combination with the two members thereof, and a gripping member loosely disposed in operative relation thereto, of means bodily movable in its relation to the gripping member for forcing said gripping member into gripping action, and means for causing said gripping member to automatically increase the gripping action in proportion to any increase in the load.

2. In a friction-clutch, the combination with the two members thereof, and a gripping member loosely disposed in operative relation thereto, of means movable to and from engagement with said gripping member for forcing said gripping member into gripping action, and means for causing said gripping member to automatically increase the gripping action in proportion to any increase in the load.

3. In a friction-clutch, the combination with the two members thereof, and a gripping member loosely disposed in operative relation thereto, of means movable bodily in its relation to said gripping member and independent of said clutch members for forcing said gripping member into gripping action, and means for causing said gripping member to automatically increase the gripping action in proportion to any increase in the load.

4. In a friction-clutch, the combination with the two members thereof, and a gripping member loosely disposed in operative relation thereto, of means movable into and out of engagement with said gripping member and independent of said clutch member for forcing said gripping member into gripping action, and means for causing said gripping member to automatically increase the gripping action in proportion to any increase in the load.

5. In a friction-clutch, the combination with the two members thereof, and a split ring loosely disposed in operative relation thereto, of means bodily movable in its relation to said split ring for forcing said split ring into gripping action, and means for causing said split ring to automatically increase the gripping action in proportion to any increase in the load.

6. In a friction-clutch, the combination with the two members thereof, and a split ring loosely disposed in operative relation thereto, of means movable to and from engagement with said split ring for forcing said split ring into gripping action, and means for causing said split ring to automatically increase the gripping action in proportion to any increase in the load.

7. In a friction-clutch, the combination with the two members thereof, and a split ring loosely disposed in operative relation thereto, of a lever bodily movable in its relation to said split ring for forcing said split ring into gripping action, and means for causing said split ring to automatically increase the gripping action in proportion to any increase in the load.

8. In a friction-clutch, the combination with the two members thereof, and a split ring loosely disposed in operative relation thereto, of a lever movable to and from engagement with said split ring for forcing said split ring into gripping action, and means for causing said split ring to automatically increase the gripping action in proportion to any increase in the load.

9. In a friction-clutch, the combination with the two members thereof, and a split ring loosely disposed in operative relation thereto, of a lever bodily movable to and from engagement between the working ends of said split ring for forcing said split ring into gripping action, a sliding collar engaging said lever for controlling its movement into and out of engagement with said split ring, and means for causing said split ring to automatically increase its gripping action in proportion to any increase in the load.

10. In a friction-clutch, the combination with the two members thereof, and a split ring disposed in one of said members in frictional contact therewith, of a lever bodily movable to and from engagement with said split ring and loosely disposed in a recess in the other member, means for controlling the movement of said lever into and out of engagement with said split ring whereby said split ring is forced into gripping action, and means for causing said lever in coöperation with said split ring to automatically increase the gripping action in proportion to any increase in the load.

11. In a friction-clutch, the combination with the two members thereof, and a split ring disposed in one of said members in frictional contact therewith, of a lever bodily movable to and from engagement with said split ring and loosely disposed in a recess in the other member, means for controlling the movement of said lever into and out of engagement with said split ring, means for causing said lever, when in engagement with said split ring, to automatically tilt and force said split ring into gripping action with its member, and means for causing said split ring to automatically increase the gripping action in proportion to any increase in the load.

12. In a friction-clutch, the combination with the two members thereof, of a gripping member loosely disposed in operative relation thereto and, when out of gripping action, movable with the member with which it grips, and means movable into and out of engagement with said gripping member for forcing said gripping member into gripping action.

13. In a friction-clutch, the combination with the two members thereof, of a gripping member loosely disposed in operative relation thereto and, when out of gripping action, movable with the member with which it grips, and a lever movable into and out of engagement with said gripping member for forcing said gripping member into gripping action.

14. In a friction-clutch, the combination with the two members thereof, of a split ring loosely disposed in operative relation thereto and, when unexpanded, movable with the member with which it grips, and a lever movable into and out of engagement with said split ring for expanding said split ring into gripping action.

15. In a friction-clutch, the combination with a split ring composed of a plurality of sections and means for operating said split ring, of means independent of the means operating said split ring for maintaining the sections thereof in operative position.

16. In a friction-clutch, the combination with a split ring composed of a plurality of sections and adapted to be forced into gripping action, of a spring engaging said sections and maintaining the same in operative position.

17. In a friction-clutch, the combination with one member thereof, and a split ring disposed in said member and composed of a plurality of sections, and adapted to be forced into gripping action with said member, of a spring engaging said sections and exerting its tension to force said split ring into frictional contact with said member and also maintaining the sections of said split ring in their relative operative position.

18. In a friction-clutch, the combination with one member thereof, and a split ring disposed in said member and composed of two sections and adapted to be forced into gripping action with said member, of a spring having bent ends and engaging said sections of the split ring, and projections on said sections of the split ring with which the bent ends of said spring engage, said spring operating to force said split ring into frictional contact with said member and to maintain the sections thereof in their relative operative position.

In testimony whereof I have hereunto set my hand in the presence of two subscribing witnesses.

EDWIN EADS ANDREWS.

Witnesses:
JOHN HEARTY,
C. S. McQUEENEY.